United States Patent [19]
Atkinson et al.

[11] Patent Number: 5,595,209
[45] Date of Patent: Jan. 21, 1997

[54] FLUID PRESSURE REGULATOR ESTABLISHING A STABLE OUTPUT FLUID PRESSURE

[75] Inventors: Louis D. Atkinson, New Berlin; Kevin M. Rave, West Allis, both of Wis.

[73] Assignee: Airtrol Components Inc., New Berlin, Wis.

[21] Appl. No.: 412,744

[22] Filed: Mar. 29, 1995

[51] Int. Cl.$^6$ .......................... G05D 16/06; F16K 39/02
[52] U.S. Cl. ................. 137/116.5; 137/82; 137/505.11; 137/505.18; 251/117; 251/282
[58] Field of Search .................... 137/116.5, 82, 137/489, 513.7, 505.11, 505.18; 251/117, 282

[56] References Cited

U.S. PATENT DOCUMENTS

| | | | |
|---|---|---|---|
| 2,761,464 | 9/1956 | Faust | 137/116.5 |
| 2,879,783 | 3/1959 | Taplin | 137/505.11 X |
| 3,662,779 | 5/1972 | Weber et al. | 137/489 |
| 3,926,208 | 12/1976 | Hoffman et al. | 137/116.5 X |
| 4,315,520 | 2/1982 | Atkinson et al. | 137/82 |
| 5,358,004 | 10/1994 | Atkinson et al. | 137/505.18 |

OTHER PUBLICATIONS

Fairchild Model 81 Pressure Regulator with inventor Rave's enlarged drawing and explanation.

*Primary Examiner*—Gerald A. Michalsky
*Attorney, Agent, or Firm*—Andrus, Sceales, Starke & Sawall

[57] ABSTRACT

A multi-stage pneumatic pressure regulator establishes a constant output pressure with a change in the output flow. The regulator includes a poppet valve connecting the input and output. A relief valve mounted on the poppet valve includes a first positioning diaphragm subjected to output chamber pressure and a vent hole to atmosphere. A pilot valve is mounted on the relief valve and includes a pressure chamber with a positioning diaphragm of a lesser area than the first diaphragm, coupled to the relief valve and opposing the first position diaphragm. A precision bleed orifice connects the pressure chamber to the input chamber and establishes a precise bleed. A presettable spring load orifice unit in the pilot valve couples the pressure chamber to the output chamber and passes the bleed flow to the output chamber and venting atmosphere. The pilot chamber pressure is greater than the output pressure and prevents feedback of the bleed. The poppet valve and pilot orifice have novel constructions. An alternative bleed passage for a single stage regulator is also disclosed.

34 Claims, 10 Drawing Sheets

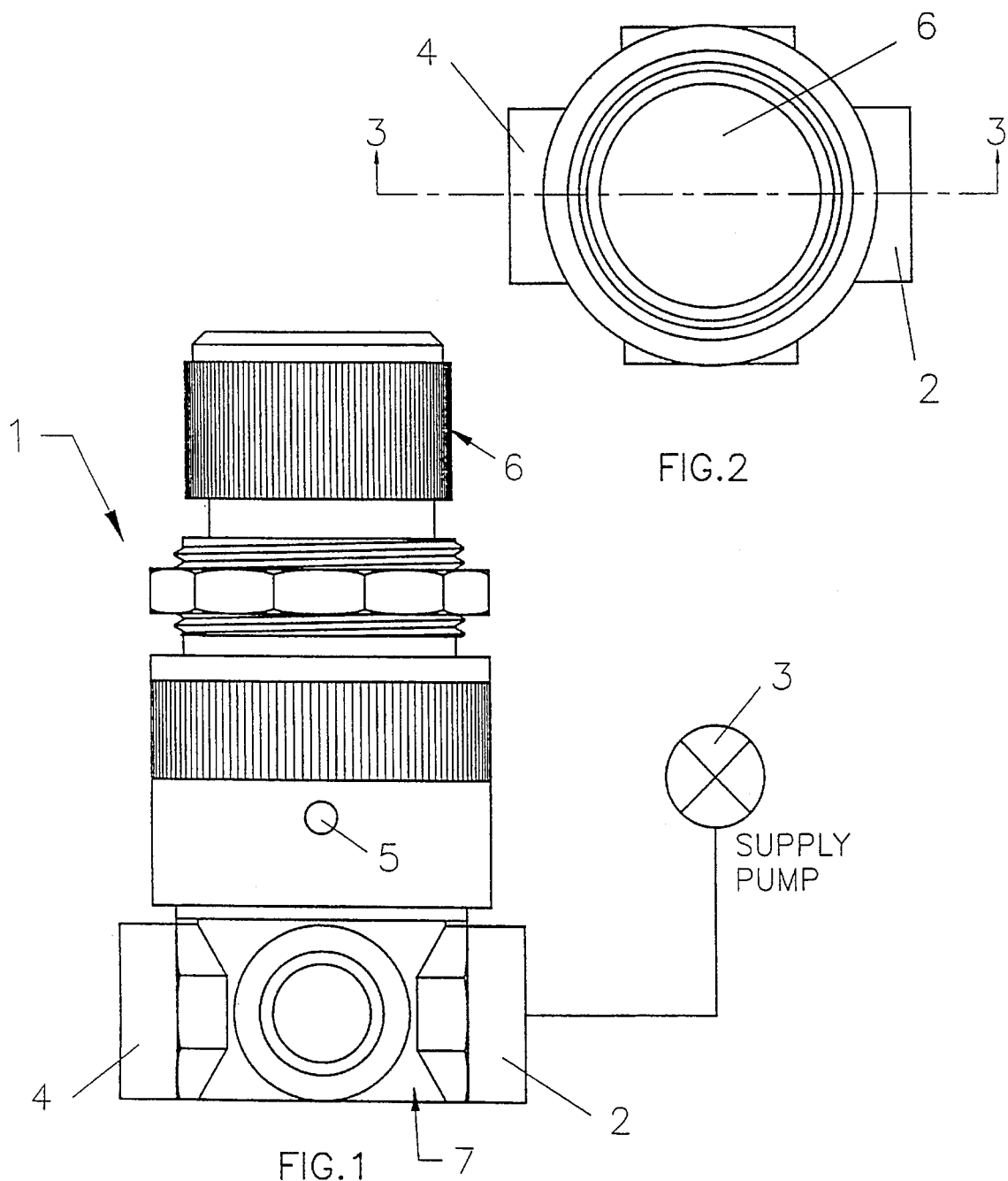

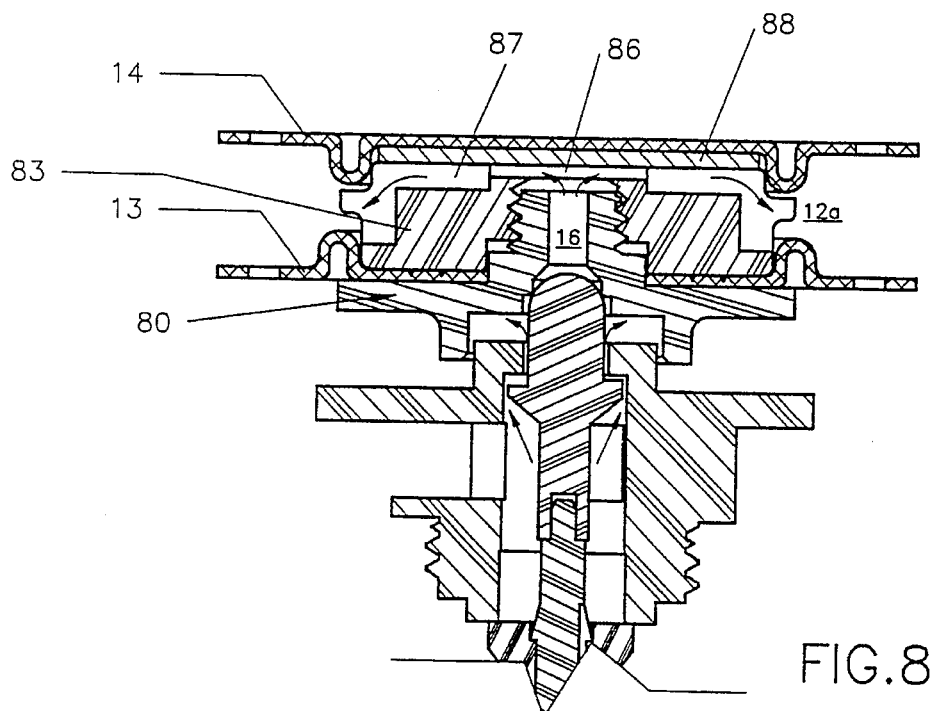
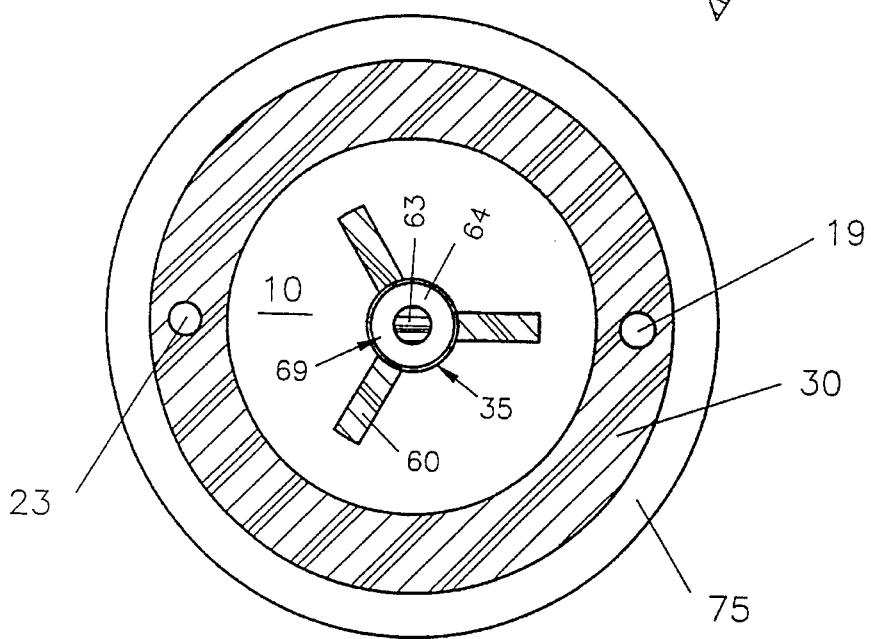

5,595,209

FLUID PRESSURE REGULATOR ESTABLISHING A STABLE OUTPUT FLUID PRESSURE

BACKGROUND OF THE INVENTION

This invention relates to a fluid pressure regulator for establishing a selected stable output pressure and particularly to pneumatic regulating valves establishing a constant output pressure with significant changes in the output flow.

Although the invention can be applied to any fluid supply, the primary application has been in connection with pneumatic supply systems. The present invention is therefore discussed in terms of pneumatic systems, although any other gas or other fluid supply can employ the teaching set forth herein.

Generally, a pressure regulator includes a regulating valve including a poppet member which should be pneumatically balanced and unaffected by changes in pneumatic pressure surrounding the valving device in order to produce a precise regulated pressure regulator. Generally, the valving device includes a poppet member moving relative to a valve seat. Various means have been provided for pneumatically balancing the poppet such that it is relatively unaffected by the pneumatic pressure conditions surrounding the poppet. In practical systems, precision pneumatic regulators include a venting valve to relief a small bleed of the supply air from the output chamber to atmosphere or the like. A leakage or bleed orifice between the input and output chambers controls internal balance in a regulator and particularly for minimizing unbalance creating conditions, such as hysteresis in the main valve as a result of trending pressure conditions as well as hysteresis effects in the various relief or bleeding valve systems. Various stablizing systems have been suggested in the prior art. Practical stabilizing systems are shown in U.S. Pat. No. 4,315,520 which issued Feb. 16, 1982 and U.S. Pat. No. 5,358,004 which issued Oct. 25, 1994. The '520 patent discloses a leakage orifice regulator having a special orifice construction to produce a stabilized system as the closure member moves to a close spaced relation and to a closed position. The '004 patent produces a stabilized system wherein a unique leakage port is incorporated into the regulator to continuously by-pass or bleed flow about the main leakport unit of the pressure regulator. Further, the prior art regulators also generally include a substantial number of components, at least some of which require precision construction. The latter construction may result in significant initial cost as well as subsequent maintenance cost. Multi-staged pressure regulators are also often used to provide even more precise pressure control in applications which require or encounter changes in the flow. In multi-staged regulators of known construction, each regulation stage involves a bleed passage for bleeding of the supply air to atmosphere. For example, a multi-stage regulator included a pilot section having a pilot chamber with an orifice unit coupled to the input side of the regulator and to the output side. A relief section had diaphragm members on the opposite sides and connected to oppositely position a relief valve which is connected to position the main or primary regulating valve and which is coupled to the output chamber to bleed fluid to atmosphere through a vent opening. A relatively substantial volume of the supply gas is consumed in the auxiliary bleeds to atmosphere; resulting in an excessive consumption of air. This large consumption is undesirable and in many applications unacceptable.

Fluid pressure regulators generally maintain a constant pressure supply at a given flow of the gas fluid. In many applications, however, a variable flow rate of the fluid may be required or encountered. Pressure regulators for a variable flow application require special construction and generally a multi-stage regulator. Although the prior art has produced pressure regulators for variable flow applications, the prior art regulators are generally of a substantial size and also relatively costly because of the particular constructions. Typically, rather expensive precision fabrication of various components may be required to produce a constant pressure with a change in the flow rate. The large size of prior art regulators may also be undesirable in some installations. A reliable and cost effective pressure regulator producing a constant pressure over a significant flow range is in demand, and particularly as a relatively small, compact structure.

There is therefore a need in the art of pressure regulators for improvements in the various stabilization systems not only to minimize the bleed fluid consumption in multi-stage regulators but to further improve the component costs of the valve construction while improving the stability and functioning of the various elements of pressure regulators, and particularly for applications which a constant pressure is demanded with a flow rate which varies significantly.

SUMMARY OF THE PRESENT INVENTION

In one aspect of the present invention, a multi-staged pressure regulator is disclosed which maintains a precise pressure control with minimal venting or bleeding of the supply gas from the system, and in particular, establishes a single small precisely controlled bleed of supply gas channelled through each regulating stage of a multi-stage regulator and then relieved to atmosphere. Generally, the multi-stage regulator includes a primary regulating valve between an input chamber and an output chamber. A relief valve is coupled to the output chamber for pressure relief venting of fluid from the output chamber. The relief valve is connected to the primary regulating valve and has a first pressure responsive component, preferably a diaphragm wall of the output chamber acting to open the relief valve. A pilot valve unit is connected over a flow control unit to the input chamber to establish a precise bleed flow to the pilot valve unit dependent only on the pressure across the control unit. Generally, the control unit includes an unregulated and uncontrolled orifice. The pilot valve unit includes a precision flow control valve unit which couples the single bleed flow to the output chamber and simultaneously establishes a balance pressure in a pilot pressure chamber within the pilot valve unit. The pilot valve unit includes a second pressure responsive component, preferably a diaphragm wall of the pilot pressure chamber. The second pressure responsive component is connected to the relief valve and opposes the relief valve setting established by the first pressure responsive component. The components are constructed and arranged such that the pressure on the pilot valve pressure responsive to the component is greater than the output chamber pressure acting on the first component and the relief valve for a given pressure and thereby compensates for upward trending pressure in the output chamber. The multi-stage regulator maintains an essentially constant output pressure with changes in the flow of the air or other fluid, within limits of the known available flow from the source and input characteristics of the source. Generally, in this aspect of the invention, a pilot control chamber is connected to the supply side of the regulator by a precision orifice unit establishing a bleed flow and incorporated into a single bleed system. The pilot control chamber includes an orifice valve configuration essentially without hysteresis to control the effective pressure within a pilot pressure chamber, with the output connected to the output chamber of the regulator and then to the input side of the pressure relief valve. The system eliminates hysteresis in the relief valving construction of the regulator output as well as compensating for downward trending pressures in the output chamber with a single bleed of the supply gas and venting thereof to atmosphere.

In the preferred construction of the multiple stage regulator, an improved pneumatically balanced poppet valve is disclosed as the primary valving device between the input and output chambers of the regulator. Finally, an improved fluid leak port orifice structure is disclosed to control the amplified pneumatic signal in the pilot control chamber wherein the device can provide a controlled output which is modulating and audible noise free, and further having exceptional stability and repeatability even in controlling amplified output signals at a ratios of approximately 1000-1 to its control signal with the response being independent of the mounted position and environmental changes and conditions such as a vibrating environment.

More particularly, the multi-stage regulator with a possible single bleed-to-atmosphere includes a primary poppet valve connected between the input chamber and the output chamber. The pneumatic supply is of course supplied to the input chamber of the valve. A pressure relief valve unit is interconnected to the output chamber for venting of air to atmosphere, and establishes an equilibrium condition with the release of a small air volume to atmosphere. The pressure relief valve unit includes a diaphragm forming a wall of the output chamber. In accordance with a preferred embodiment of the present invention, a precision orifice is coupled to the supply side of the regulating valve and bleeds a small volume of supply gas to a pilot chamber unit including a pressure responsive output member. In a preferred construction, the pilot chamber includes a flexible diaphragm responsive to the pneumatic pressure in the pilot chamber with a preselected effective area less than the effective area of the diaphragm of the pressure relief valve unit. The pilot diaphragm is coupled to the relief valve in a manner to exert a downward or opening pressure to seal the relief valve unit and to open the primary poppet valve unit. The pressure in the pilot chamber is controlled by an orifice nozzle valve structure, generally similar to that disclosed in the previously identified U.S. Pat. No. 4,315,520. The orifice nozzle valving unit varies the pressurization in the pilot chamber and passes a regulating equilibrium bleed of gas to the pilot output chamber which is connected to the output side or chamber of the primary regulating valve. The flow of the bleed gas from the orifice nozzle valving unit is equal to the bleed flowing through the precision orifice which controls the bleed flow into the pilot chamber. This bleed flow into the output chamber of the primary poppet valve creates an upward trending balance in the pressure chamber. This acts on the pressure relief valve unit to open the relief valve configuration and close the primary valve. Thus, the bleed flow into the output chamber tends to oppose the pilot chamber force. The relative effective force of the pilot chamber diaphragm in relation to the output chamber diaphragm creates a condition under which the pilot chamber pressure must be higher in the same ratio as the difference in the effective area of the diaphragm, or other force transmitting members of the output chamber and the pilot chamber, in order to establish equilibrium. This pressure ratio is a significant factor and for optimum operation is a crucial factor, in order to eliminate the possibility of a feedback imbalance at the pilot chamber with the upward trending pressure in the output chamber. The upward trending pressure does not effect the pressure in the pilot chamber as such and thus allows forces applied to the output chamber diaphragm to overcome the forces applied to the pilot chamber diaphragm to open the relief valve unit for creating the single small bleed of air-to-atmosphere.

In a preferred embodiment of the present invention, the regulator includes a primary regulating valve unit or section including a valve body having an inlet port and chamber and an outlet port and chamber with a wall therebetween within which a primary orifice valve opening is provided.

The wall unit of the main or primary regulating valve section in the multi-stage regulator includes the cylindrical wall forming a part of the regulator valve body with a threaded opening. A poppet valve seat body includes a threaded component with a valve opening and a flat valve seat. The cylindrical wall and the seat body having a flat coplanar sealing surfaces extending from the mating threaded connection. The above construction of the wall unit particularly adapts the construction to a single stage regulator including a leakport orifice system formed at the coplanar sealing surfaces and generally functioning as shown in the previously identified U.S. Pat. No. 5,358,004. The leakport orifice is formed by a precision bleed groove in the mating precision surfaces with the threaded junction and groove forming a precision leakage orifice between the regulator input chamber and the output side or chamber of the primary poppet valve unit.

In another aspect of the preferred embodiment, a special two-piece poppet structure is especially constructed to create a balanced poppet attached to a compensating chamber in line with the primary valve orifice, with the outer end of the poppet serving as the closing and sealing member of the poppet valve orifice. The poppet is formed of resilient material and has a central axial opening. A member is secured within the opening and extends into the compensating chamber and into the primary orifice and thus the output chamber. The stem member has a proper located enlargement to engage opposite ends of the poppet to secure the elements as an integrated unit. The stem and poppet are sealed except for a small passageway or slot formed at the axial interface to transmit the output pressure of the output chamber into the compensating chamber to balance the pneumatic forces on the poppet. The poppet is formed of a durometer with interconnecting projections and recesses on the members which permit the deformation of the members for assembly of the stem with the poppet member proper. In addition, the cross-sectional configuration of the poppet between the compensating chamber and the primary orifice is constructed with a generally hour-glass configuration to balance the forces at the input chamber and the output chamber on the valve poppet. Thus generally, the compensating chamber end is of a somewhat smaller diameter than the primary sealing end with an intermediate portion of a lesser diameter. The shape of the outer surface of such intermediate portion is such that the input forces and the output forces in combination provide a pneumatically balanced poppet.

The new poppet valve stem unit in a preferred construction is formed with the hour-glass shaped body member having the central opening which is enlarged at the valve seating face. The poppet stem extends through the central opening with a stop member formed on the inner end and a conically-shaped stop member aligned with the enlarged central opening and extending outwardly from the enlarged opening. The hour-glass shaped body member includes an enlarged flat valving end and an enlarged compensating chamber sealing end joined by a substantially cylindrical portion. The conical stem portion with the flat valving end and inner end of the sealing end portion are designed to create effective areas subjected to the output chamber pressure with net areas in combination with the spring force biasing the poppet valve unit closed. The two part poppet valve unit is readily formed as precision injection molded components, ensuring accurate, repeatable preset fabrication. The components can be assembled as a snap together assembly. The result is a particularly simple and cost effective poppet valve member producing consistent operation of the regulating valve.

The poppet valve stem extends through the output chamber and is connected to the pressure relief valve having a diaphragm mounted seat and a closing member connected to the poppet valve stem. A pressure relief section includes the diaphragm mounted valve seat which is secured in stacked relation to the regulator valve body, for movement in accordance with the pressure of the output chamber. The opposite side of the pressure relief section is closed by the diaphragm of the pilot control section. The pilot diaphragm is also coupled directly to the movable relief valve seat and the pressure relief section to close the section except for a relief opening to allow the bleed of gas to the primary relief valve-to-atmosphere. The pilot control section includes an annular body member abutting the pilot diaphragm with a central recess plate forming a pilot pressure chamber with the pilot diaphragm and an output chamber to the opposite side of the recess plate. A controlled pneumatic orifice unit is located within the center of the plate. A passageway through the side walls of the several sections and the poppet valve section connects the pilot chamber to the input chamber with a precision orifice within the passageway controlling the bleed rate of the supply air to the pilot chamber. The orifice unit within the wall structure is a precision orifice having a flat seal edge located within the output chamber of the pilot section. A web spring is a flat, rigid member overlying the orifice seal edge, preferably with a controlled durometer interface attached to a plate for closing the orifice. The plate is connected by a multiple spring arm assembly to the chamber walls to support the flat, rigid member in a precise parallel relationship to the flat seal edge. An adjustable set joint pre-load section has a substantially single point member coupled to the center of the flat, rigid member in axial alignment with the orifice at the very center thereof. The forces on the flat, rigid member consists of the applied force of the pre-load unit and the pilot chamber pressure. The construction maintains the precise parallel co-planar relationship between the closure structure and the flat seal edge during modulating and maintains control in any mounted position, in a vibrating and other destructive environmental conditions. The improved orifice nozzle for pneumatic application can control an amplified signal at approximately 1000 to 1 ratio to its control signal. As a result, an improved bleed orifice control of the pilot chamber pressure and the bleed flow through the precision orifice to the output chamber of the pilot chamber is achieved. The output chamber is coupled by a passageway through the outer walls of the several sections to the output chamber of the regulator and thus is applied to the pressure relief diaphragm of the pressure relief valve unit.

In summary, the present disclosure includes an improved multi-staged regulator with low volume consumption of supply air in stabilizing of the regulator and, in a preferred construction, including an improved poppet valve unit, having a cost effective leakage orifice around the poppet valve as well as an improved bleed pilot control unit having an improved pilot set point orifice unit. The preferred construction further discloses a structural arrangement which minimize the component parts required in the construction of a pressure regulator and thereby contributing to the cost-effective construction of a regulator while maintaining and even improving the operating result. The several sections and components of the preferred multi-stage regulator are particularly adapted to use in other regulators such as single stage regulators. The poppet valve unit with the balanced poppet provides an improved main regulating valve structure for all single stage regulators and multi-stage regulators.

The separating wall unit provides a standard component readily modified with a leakage bleed orifice for a single stage regulator. The pilot orifice nozzle unit provides an improved orifice valving system with consistent and repeatable operation for establishing a controlled output that will be modulating and audible noise free in other single stage regulators.

The various structural and functional features of the multi-staged regulator and the various unit and proprietary components thereof are more fully illustrated and described in the preferred embodiments of the present invention as shown in the drawings and hereinafter described.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings:

FIG. 1 is a side elevational view of a multi-stage regulator constructed in accordance with the teaching of the present invention;

FIG. 2 is a top view of the multi-stage regulator as shown in FIG. 1;

FIG. 8 is an enlarged cross sectional view of the relief valving section showing the bleed flow to and through the relief valve;

FIG. 9 is a horizontal cross-sectional view of the output chamber taken generally along line 9—9 of FIG. 3;

DESCRIPTION OF THE ILLUSTRATED EMBODIMENT

Figure 3:
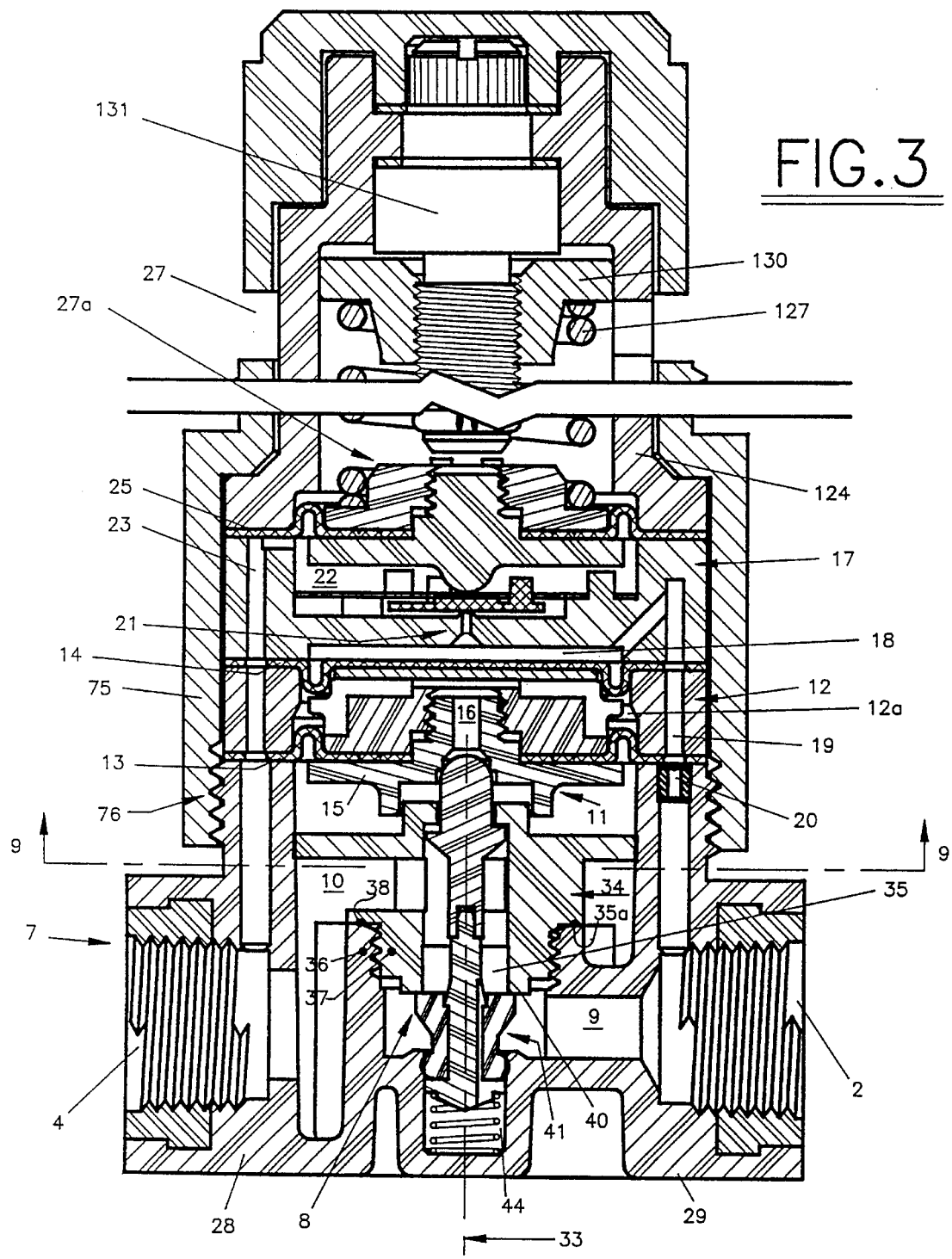
FIG. 3 is a vertical cross-sectional view of the regulator taken generally along line 3—3 of FIG. 2.
Figure 4:
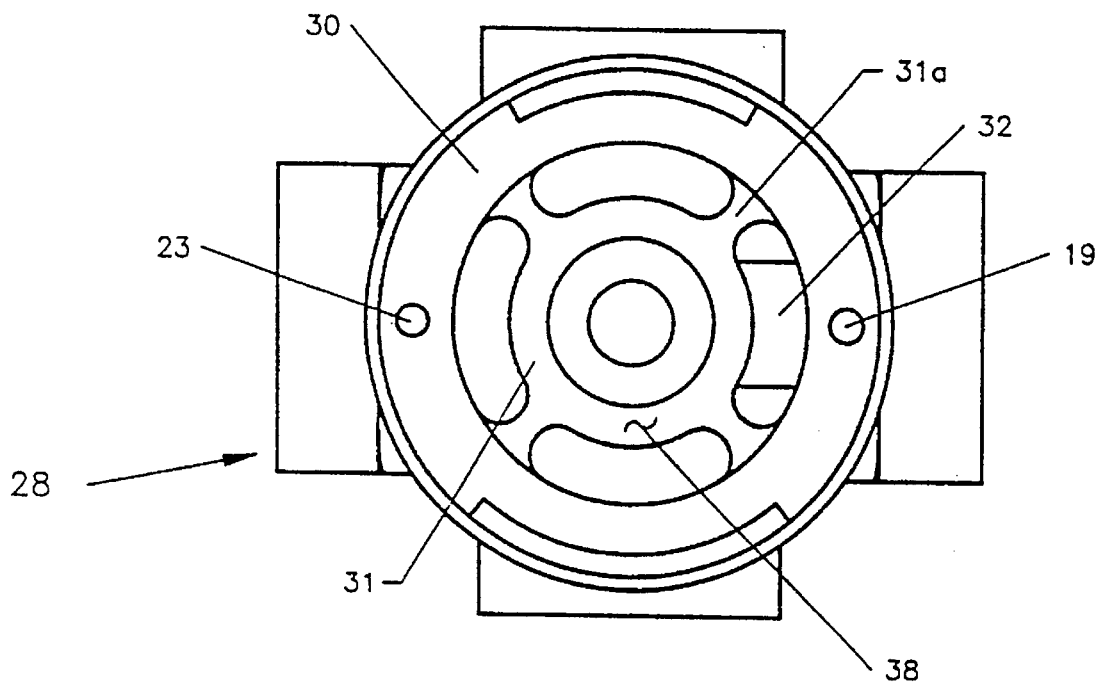
FIG. 4 is a plan view of the regulator valve body member shown in FIGS. 1–3.
Figure 5:
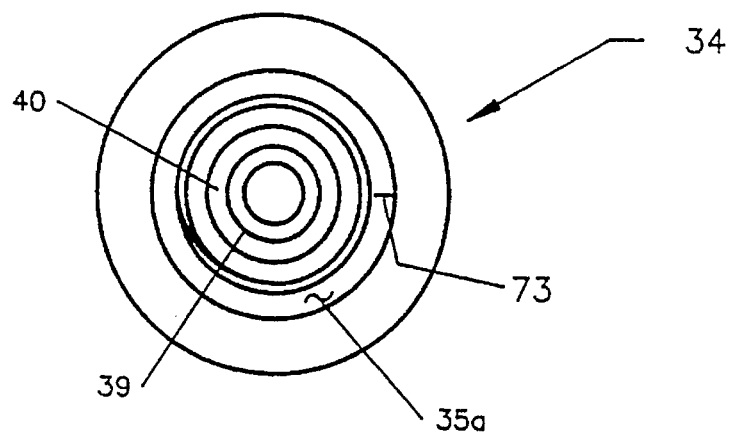
FIG. 5 is a bottom view of a primary regulating plate shown in assembled relation to the valve body of FIG. 4 in FIG. 3.
Figure 6:
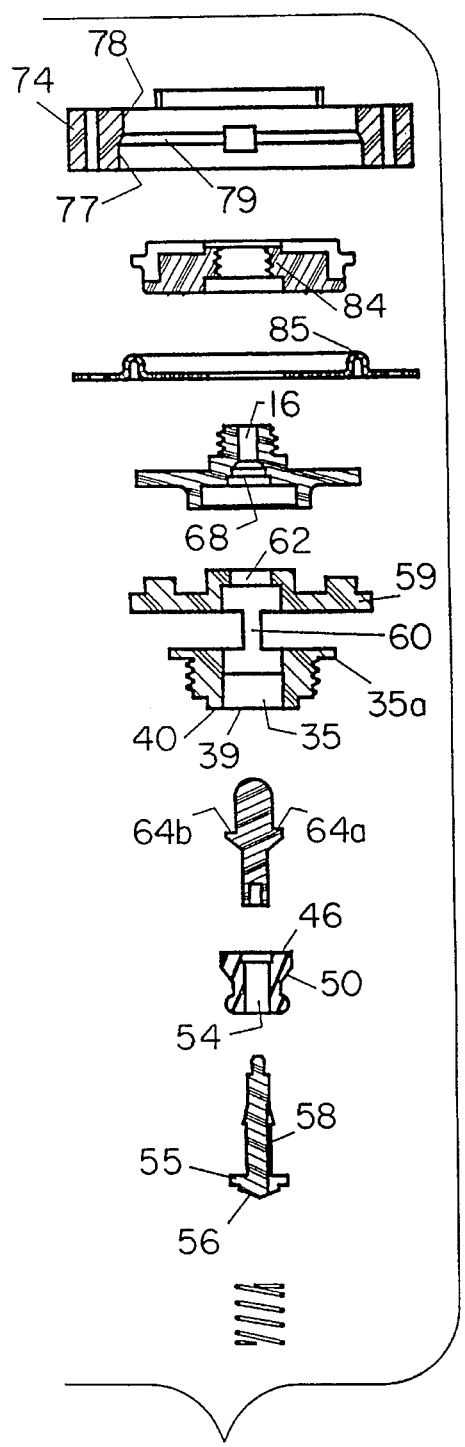
FIG. 6 is a sectional exploded view of the primary poppet valve assembly and a relief valving section shown in FIG. 3.
Figure 7:
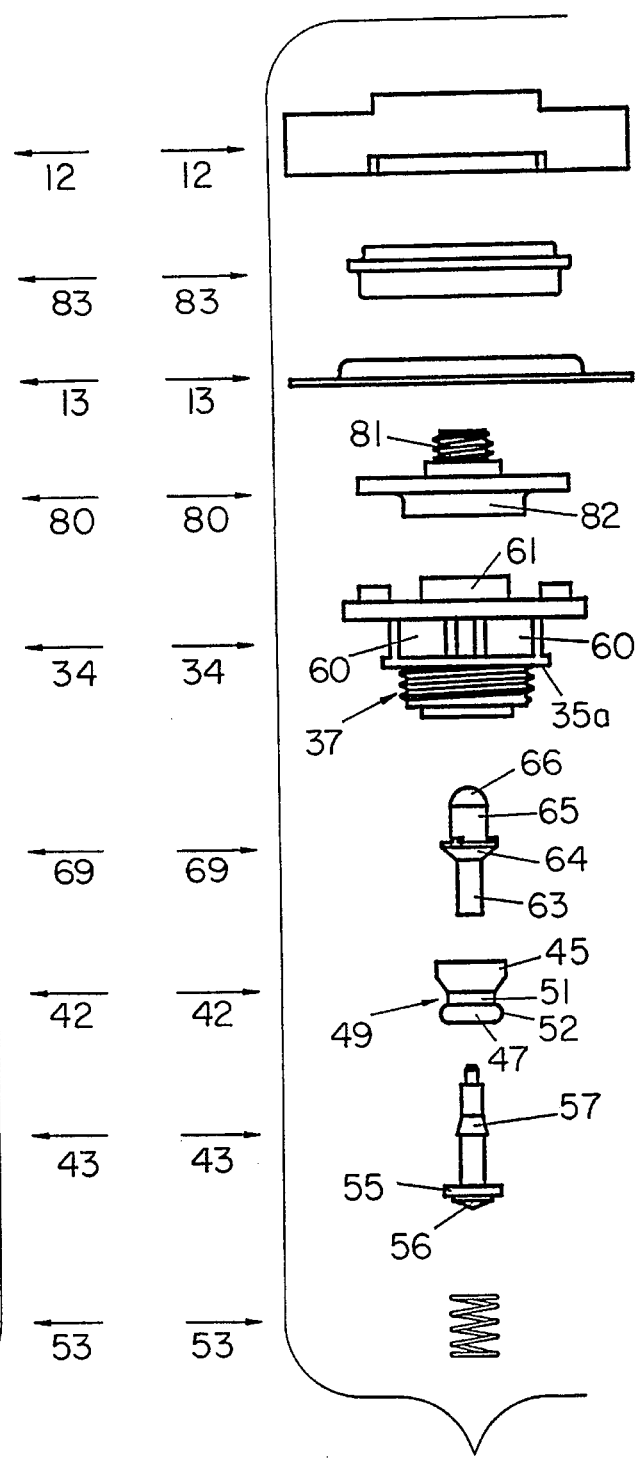
FIG. 7 is an elevational exploded view of the components shown in FIGS. 3 and 6.
Figure 10:
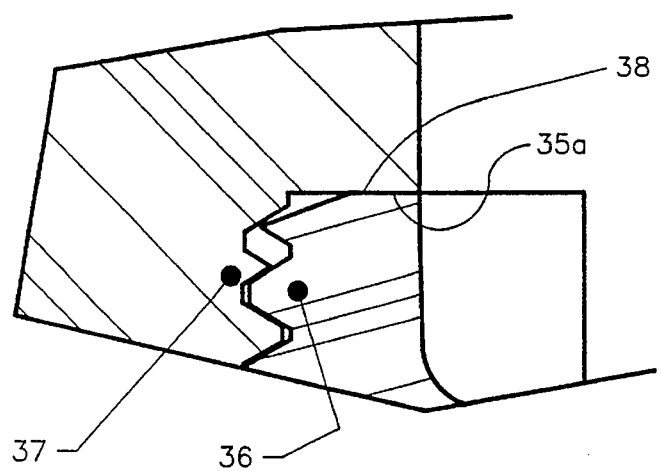
FIG. 10 is an enlarged fragmentary view of a portion of the primary poppet valve structure.

Referring to the drawings and particularly to FIGS. 1 and 2, a multi-stage pressure regulator 1 is illustrated having an inlet port 2 connected to a supply 3. An outlet port 4 is connected to the output side of the regulator 1 to provide a regulated output pressure. The regulator 1 includes a single bleed hole or opening 5 for bleeding of a small volume of the supply air-to-atmosphere as a part of the stabilization of the regulator. A rotatable control knob or element 6 is provided for presetting of the regulated output pressure at the outlet port 4. Although multi-stage regulators are well known in the art, the illustrated embodiment provides an improved result in providing a single bleed of the supply air-to-atmosphere rather than a plurality of bleeds for each stage of regulation and a regulation which can maintain a constant output pressure with changes in the output flow rate. A preferred construction is illustrated in FIGS. 3–14.

Referring particularly to FIG. 3, the regulator 1 consists of stacked sections interconnected and related to supply a stabilized regulated output pressure, with a minimum consumption of the supply air.

Generally, the illustrated regulator includes a primary orifice valve section 7 including the inlet port 2 and the outlet port 4. A poppet valve unit 8 is incorporated into the valve section 7 and forms an inlet chamber 9 direct connected to the inlet port 2 and an output chamber 10 direct connected to the outlet port 4. A pressure relief valve unit 11 is coupled to the poppet valve unit 8 and is subject to the pressure in the output chamber 10. As most clearly shown in FIGS. 3 and 8, the pressure relief valve 11 also forms part of a relief chamber section 12 and by-passes air from the output chamber 10 into chamber 12a of section 12. The vent hole 5 discharges the bleed air to the atmosphere. The pressure relief valve unit 11 constitutes the sole discharge of control bleed air via the section 12 to the atmosphere in the multi-stage regulator illustrated.

The relief chamber section 12 includes spaced movable walls, shown as diaphragms 13 and 14, interconnected to valve unit 11. The diaphragm 13 abuts an opening of the valve section 7 and forms a closure wall of the output chamber 10. One part of relief valve 12, shown as a valve seat unit 15, is secured to the center of the diaphragm 13 and thus is positioned in response to the pressure in the output chamber 10. The valve seat 15 includes a valve opening 16 for venting of a portion of the output chamber 10 to the relief section 12 for bleed to atmosphere through port 5. The diaphragm 14 is secured to the opposite axial end of the pressure relief section 12 and forms a common wall between a pilot control section 17 and the pressure relief section 12. Diaphragm 14 is also coupled to the valve seat unit 15 and establishes an opposing force trending to oppose and balance the force on the diaphragm 13, as hereinafter developed.

Figure 11:
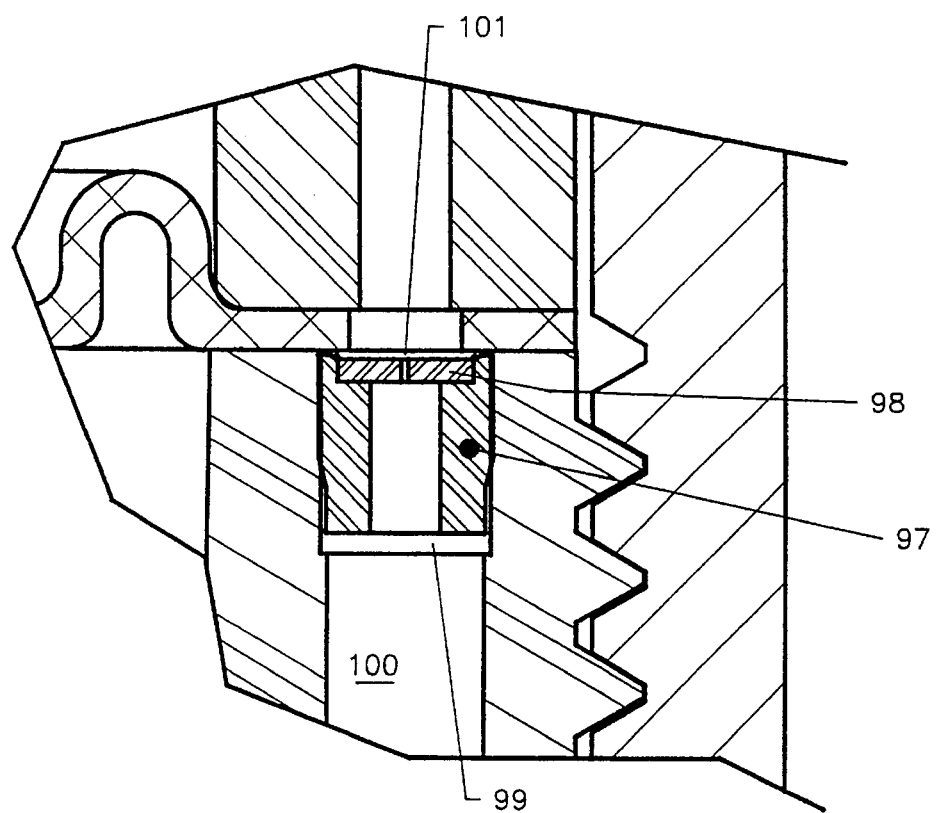
FIG. 11 is an enlarged fragmentary view of a bleed supply orifice.
Figure 12:
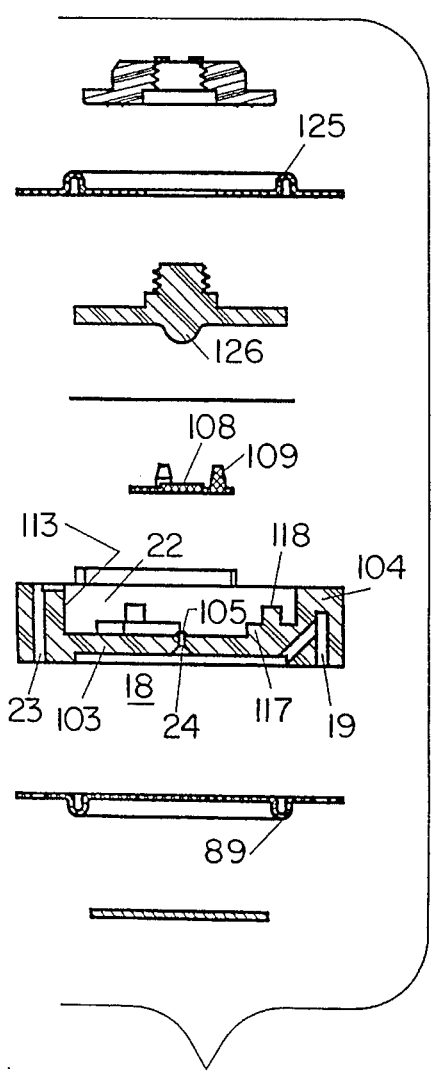
FIG. 12 is a sectional exploded view of the relief valve assembly through the pilot control section.
Figure 13:
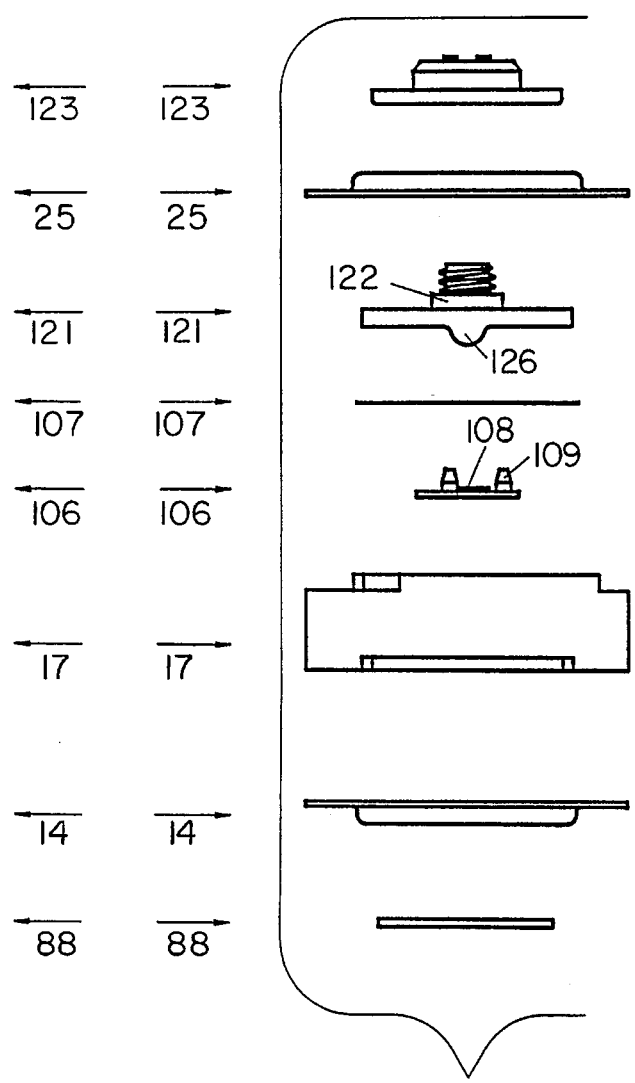
FIG. 13 is a view of FIG. 12 showing components in elevational.

The pilot control section 17, as most clearly shown FIGS. 3, 12 and 13, includes a pilot pressure chamber 18 abutting the diaphragm wall 14. A bleed passageway 19 connects the pilot pressure chamber 18 to the inlet port and thus to input chamber 9 of the valve section 7. A precision orifice 20, shown in FIGS. 3 and 11, is secured within the passageway 19 and establishes the bleed flow rate of supply air to the pilot chamber 18. Generally, a bleed in a pressure regulator is a flow of the supply gas through an uncontrolled and unregulated orifice between the input and output. In the present invention, a single bleed passage is used, with the precision orifice 20 (FIGS. 3 and 11) generating the bleed flow which is channeled through each stage of the regulator and vented to atmosphere through the relief valve unit 11. The bleed in the channeled passageway is equal to the flow to atmosphere. The pressure in the pilot chamber is further controlled by an orifice unit 21 within the section 17, which connects the pilot pressure chamber 18 to a pilot output chamber 22. A passageway 23 connects the pilot output chamber 22 back to the output port and the output chamber 10 to provide a controlled bleed of the air from the supply side to the output chamber 10 at a rate set by the precision orifice 20. The orifice unit 21 includes an orifice 24 connected between the pilot pressure chamber 18 and the output chamber 22. An outer diaphragm 25 defines the exterior wall of the pilot output chamber 22 and includes a closure unit 26, most clearly shown in the enlarged view of FIG. 13a, overlying the orifice 24. A set point section 27, shown in FIG. 3, includes a control member 27a aligned with closure unit 16 for biasing unit 26 into selected closing relation to the discharge end of orifice 24. The control member 27a is connected to the knob 6 for selecting of a preset bias on the diaphragm 25 and the closure unit 26, and thereby the selection of a regulated output pressure.

Generally, the illustrated regulator 1 functions in response to the differential pressures applied by the pilot chamber 18 and the output chamber 10 across the pressure relief valve section 11. As more fully developed hereinafter, the diaphragm 13 has a larger effective area than the pilot chamber diaphragm 14. The pressure of the pilot chamber 18 tends to seal the relief valve opening 16 and to open the primary poppet valve unit 8. The pressure in the pilot chamber 18 is controlled by the orifice nozzle unit 21 of the control section 17 with the bleed flow continuously to output chamber 10. The bleed flow to the output chamber 10 of the regulator 1 creates an upwardly trending imbalance in the pressure of the output chamber 10. This upwardly trending output pressure tends to close the primary poppet valve unit 8 and to open the relief valve opening 16 and thus acts in direct opposition to the forces of the pilot chamber 18 and associated diaphragm 14. The pilot chamber diaphragm 14 has an effective area which is less than that of the output chamber diaphragm 13 and consequently the pilot chamber must establish a higher pressure than that of the output chamber. The ratio of the pressure is the same ratio as established by the effective diaphragm areas in order to establish equilibrium of the regulating components. The pressure ratio relationship between the chambers for optimum operation is crucial in order that the pilot chamber pressure eliminates the possibility of feedback and imbalance as a result of the bleed flow creating an upward trending pressure in the output chamber. Such upward trending pressure in the output chamber is isolated from and does not effect the pressure in the pilot chamber, and thus allows the forces applied to the output chamber diaphragm 13 to overcome forces applied to the pilot chamber diaphragm 18. This is necessary to open the relief valve unit 11 for release of a small bleed and venting of air to the atmosphere or the like via the port or hole 5. The result is a multi-stage regulating valve which will maintain precise pressure control with minimal bleeding of supply air-to-atmosphere. The system thus maintains the well known requirement of maintaining or controlling a slight internal imbalance by a bleed of supply gas to the output chamber. The single bleed will eliminate any hysteresis in the orifice chamber as well as hysteresis in the pressure relief valve unit and is also available to compensate for downward trending pressures in the output chamber and thereby helps to minimize the hysteresis of the primary poppet valve system.

More particularly, the preferred illustrated embodiment of the invention also includes a special structure of the poppet valve unit 8, the pressure relief valve unit 11 and the valved orifice unit 21, each having unique proprietary constructions.

Referring to the drawings and particularly to FIG. 3, the poppet valve 8 and pressure relief valve unit 11 are mounted within a body member 28 having a generally cup-shape with opposite tubular threaded projections defining the inlet port 2 and the outlet port 4. The cup-shaped body has a bottom or base wall 29 and an opposite opening outer wall sealed by diaphragm 13 (FIGS. 3 and 4) and the interconnected valve seat unit 15. The body 28 includes an outer wall 30 which is a relatively thick cylindrical wall including portions of the passageways 19 and 23. A cylindrical inner wall 31 is spaced from outer wall 30 and interconnected thereto by a plurality of circumferentially spaced webs 31a. The inner cylindrical wall 31 includes a lateral extension 32 integral with the outer wall 31 and forming an connection to the inlet port 2. Cylindrical wall 31 includes an enlarged axial opening within the body which is aligned with valve opening 16 and defines a common axis 33 for the two valve units. A primary control plate unit 34 is secured within the outer end of the axial opening of the cylindrical wall 31. The control plate unit 34 includes a central valve opening 35 located between the input chamber 9 and the output chamber 10 of the poppet valve unit 8. The enlarged opening wall 31 has an outer flat shoulder 38 which defines a finished surface. The interior of the wall 31 is threaded inwardly, as at 36, to the level of the lateral passageway of the inlet connecting wall 32. The control plate member 34 has a tubular threaded portion 37 which threads into the threaded wall 36. The threaded tubular portion 37 has a shoulder 35a which abuts the shoulder 38 of wall 31 with the threaded tubular portion in the final position. The surfaces of shoulders 35a and 38 are finished surfaces and provide a sealed interface within the output chamber opening through the walls 31, 32 and threaded portion 37 of the control plate unit 34. The innermost end of the threaded tubular portion 37 ends in a stepped face with an inwardly stepped end which is finished to a flat face having a sharp inner edge 39, (most clearly shown in FIG. 6) a flat valve seat 40 with edge 39 defining an orifice. The valve seat 40 thus defines the separation between the input chamber 9 and the output chamber 10 within the valve body 28. The poppet valve unit 8 includes a two-piece poppet assembly 41 consisting of a poppet 42 and a central separate stem 43 which extends co-axially through the center of the poppet 42 with a substantially sealed interface engagement. The poppet 42 is mounted within the slightly enlarged portion of the inlet chamber 9 located between the flat valve seat 40 and a compensating chamber 44. The inner end portion 45 of poppet 42 is a generally cylindrical portion having a diameter greater than the valve seat opening 35. The inner end face 46 of the end portion 45 is a flat sealing wall adapted to abut the end face and valve seat 40 to selectively close the edge orifice between the input chamber 9 and the output chamber 10. The outer end portion 47 of poppet 42 is of a smaller diameter than that of the inner end portion 45. The outer end portion 47 projects into the inner end of the compensating chamber 44 and is sealed to the wall thereof to seal the compensating chamber. The connecting portion 49 of poppet 42 between the end portion 45 and 47 is of a reduced diameter to define a generally hour-glass shaped poppet. The intermediate portion includes an inwardly inclined portion 50 connected to the end portion 45 and a cylindrical portion 51 connected to portion 47. The cylindrical portion 51 has a diameter less than that of the outer end portion 47.

The outer end portion 47 of poppet 42 has a semi-circle edge surface 52. With the poppet formed of a suitable durometer rubber-like material, the insertion of the portion 47 into the open end of compensating chamber 44 seals the chamber.

As previously noted, the poppet 42 has a central opening 54 through which a stem 43 extends. Stem 43 is an elongated rod-like member having an inner locking collar 55 abutting the inner wall of poppet 42 within the compensating chamber 44. A spring 53 is located within the chamber 44. The inner end of stem 43 is formed with a spring guide 56 for centering and maintaining of force distribution of the spring 53. A locking lip 57 is formed on the stem 43 and located in spaced relation to the locking collar 55 in accordance with the length of the poppet 42. The locking lip 57 is defined by a frusto-conical portion on the stem 43 with a radial locking lip projecting outwardly from the stem 43. The stem 43 is forced through the opening in the poppet 42 from the compensating end thereof. The frusto-conical portion of lip 57 with appropriate deflection of the poppet 42 allows the stem 43 to pass through the poppet 42 with a snap connection.

The stem 43 is formed with an axial slot 58 which extends through the locking lip 57 and the locking collar 55 to connect the output chamber 10 to the compensating chamber 44 with the poppet in closing engagement with the valve seat 40. Thus, essentially identical output pressure is applied across the poppet valve to develop a balanced poppet. Similarly, the effective areas of the opposite ends of poppet 42 are equally subject to the input chamber pressure, if selected, to provide and maintain a balanced condition.

A typical construction is illustrated and explained in the attached Appendix I. As shown in the attached Appendix, the subject pressure balance establishes a net force at 100 psi input pressure of about 23 grams of closing pressure, and the output pressure and the compensating bias spring establish a net closing force, at 100 psi, about 15.7 grams. The Appendix I includes an enlargement of the illustrated poppet valve unit, with a typical practical construction which has been incorporated into a compact multi-stage regulator. The balanced characteristic resulting from the particular construction is also summarized therein.

The opening 35 in the control plate unit 34 extends outwardly to form a portion of the outlet chamber 10 from the poppet valve orifice 39. Plate unit 34 includes a round collar 59 which extends radially into guiding or locating engagement with the inner surface of cylindrical wall 30. The collar 59 is connected to the threaded portion by circumferentially spaced walls 60, as more clearly shown in the cross-sectional views of FIG. 9.

The collar portion 59 of the plate unit 34 includes an axially offset cylindrical portion 61 with a central opening 62. A stem 63 is coupled to the inner end of stem 43 of the poppet valve by a recess and projecting coupling 64. The stem 63 is of a slightly greater diameter than stem 43 and projects upwardly through the opening in the offset portion of the plate collar 59. The stem 63 includes a somewhat enlarged frusto-conical portion 64 which tapers outwardly and laterally within the offset portion of collar 59. Portion 64 has offset flat faces 64a and 64b spaced from face of the offset portion 61. Stem 63 extension projecting upwardly through the opening 62 into the valve seat unit 15 of the pressure relief valve. The outer end of stem 63 extends outwardly as an enlarged stem and 65, with outermost rounded end, as at 66.

The outer end of the pressure relief valve stem member is rounded and projects inwardly into the valve seat unit 15. The pressure relief valve opening 16 is enlarged at the output chamber 10 and includes a stepped portion defining a sharp valve seat 68 selectively engaged by and spaced from the rounded end 66 of the pressure reliefstem 65 to define an accurate relief orifice from the output chamber 10 to the chamber 12a of pressure relief section 12. The orifice provides a controlled small bleed of the output pressure to atmosphere as required for establishing a stable pressure regulation, with a minimum consumption of regulating air to atmosphere.

The compensating loading of spring 53 permits the inward movement of the pressure relief stem 63 and the inner connected poppet unit 8 to simultaneously position the pressure relief valve member 69 with respect to the valve seat 68 and to move the total assembly with the closing movement of the poppet valve.

The pressure relief section 12 includes the pressure relief valve seat unit 15 having the opening 16 terminating within the pressure relief chamber 12a for discharge to the atmosphere through port 5. As most clearly illustrated in FIGS. 3, 6 and 7, the pressure relief section 12 includes an annular wall 74 having a thickness substantially corresponding to the thickness of the cylindrical wall 30 of the body 28. The annular wall 74 has opposite flat end surfaces with one flat end secured to the body wall 30 with the outer portion of diaphragm 13 interposed in sealing relation therebetween, as shown in FIG. 3. The diaphragm 14 is secured abutting the opposite or outer end face of the annular wall 74 and providing for a sealed connection as a common wall to the pilot chamber section 17. Generally, an outer clamp housing 75 has an internal threaded portion which threads onto a correspondingly threaded the outer end of the cylindrical wall 30 of the valve body 28, as at the threaded connection 76.

The annular wall 74 has an inner round opening of a step diameter consisting of a first round opening 77 adjacent the diaphragm 13 and a second round opening 78 of a smaller diameter adjacent to the pilot chamber diaphragm 14. The round openings are connected by a smooth inclined portion 79.

The valve seat unit 15, as previously noted, is a two-piece assembly affixed to the diaphragm 13. It includes a valve plate 80 including opening 16. Valve plate 80 is located within the chamber 10 with a central tubular and exteriorly threaded hub 81 extending upwardly through an opening in the diaphragm 13. The underside of the plate 80 has an annular projection 82 projecting downwardly over the offset portion 61 of the plate unit 34, which provides for guided axial movement of the valve plate 80. A clamp plate 83 is located within the chamber 12a and has a central threaded opening threaded onto the hub 81 to establish a threaded connection 84. The plates 80 and 83 are clamped tightly onto the diaphragm 13 to move the valve seat unit 15 along the axis 33 of the poppet valve in response to pressurization of the output chamber 10. The clamp plate 80 has a diameter slightly less than the diameter as defined by the inner surface of the wall 30. The clamp plate 83 within the relief chamber 12a has a diameter less than the opening 77 and also than that of the plate 80. The clamp plate 83 thus defines a gap between the round opening 77 and the outermost edge of the clamp plate 83. The diaphragm 13 includes an annular convolution 85 projecting upwardly into the gap between the annular wall 74 and the clamp plate 83. This permits the diaphragm 13 with the attached valve seat unit 15 to move freely on the axis 33 of the poppet valve 8 to hold the valve seat 15 parallel with respect to the valve stem of the pressure relief valve unit 11. The innermost end of the inner clamping plate 83 includes a circular shaped countersink 86 overlying the opening 16 in plate 80. A cross-opening groove 86 in the clamping plate 83 permits communication between the valve opening 16 and the chamber 12a. The cross-portion of the extension forms a locating plate 88 abutting the diaphragm 14. The plate 88 again is spaced from the inner wall of opening 78 in annular wall 74 to form a gap within which an annular convolution 89 of diaphragm 14 extends.

The convolution 89 again permits the axial planar movement of the valve seat unit 15 on the axis of the poppet valve unit 8 in response to the pressure in pilot chamber 18. The differential sized openings 77 and 78 define the effective areas of the diaphragms 13 and 14. The effective area of the diaphragm 14 is significantly less than that of the diaphragm 13. This provides a differential area requiring a differential pressure condition within the pilot chamber 18 relative to the output pressure of the output chamber 10. The pressure in chamber 18 is controlled by the precision orifice 20 and the orifice unit 21.

Figure 13A:
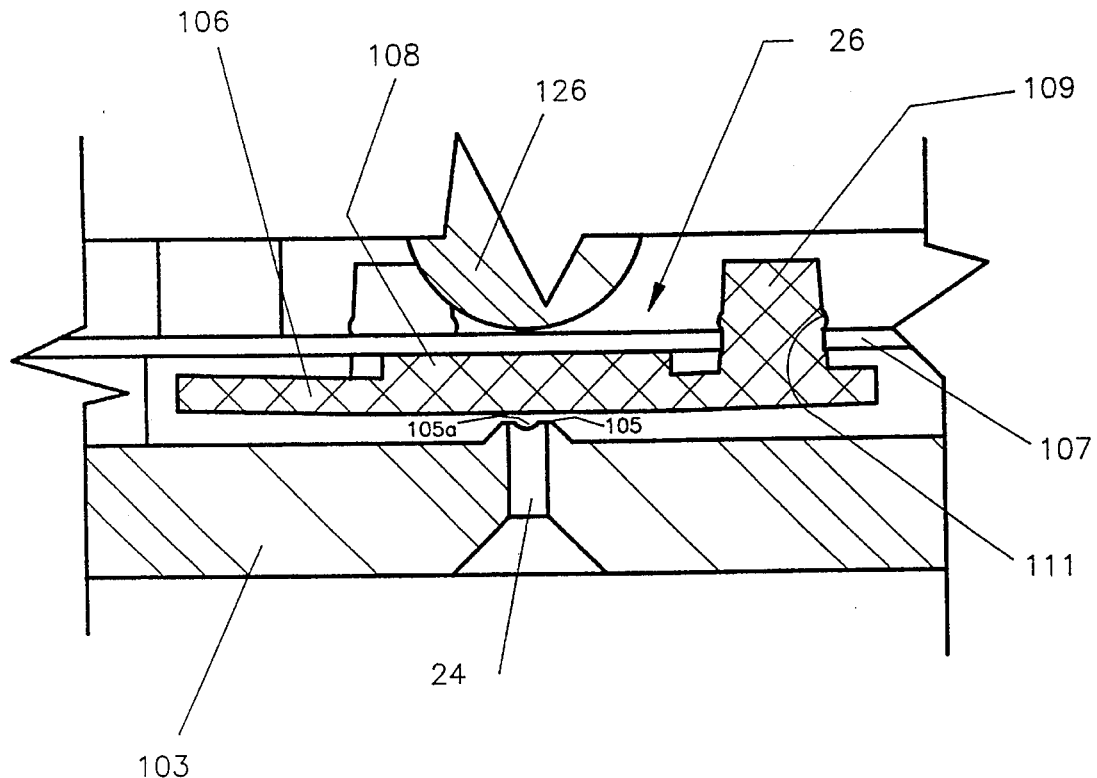
FIG. 13a is an enlarged fragmentary view of the leakport orifice of a pilot control chamber shown in previous figures.
Figure 14:
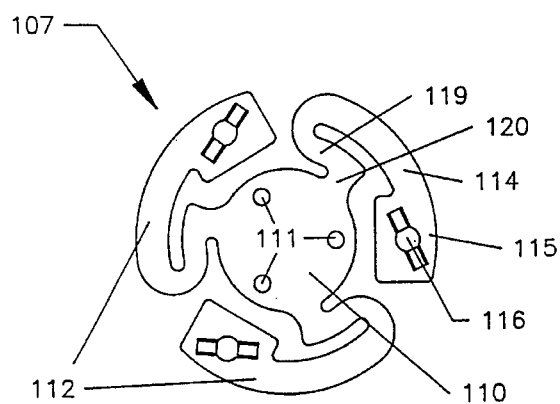
FIG. 14 is a top view of a web spring shown in FIGS. 3, 12 and 13.

The illustrated precision orifice 20 (FIG. 11) is a separately formed item having an outer cylindrical wall 97 closed by an outer end wall 98. The precision orifice 20 is located within a recess 99 in the outer end of the opening 100 of passageway 19 within the annular wall 30 of valve body 27. The precision orifice 20 is formed in the end wall and aligned with the passageway 19 to establish a precise bleed flow from the input port and chamber 9 to the pilot pressure chamber 18. The pressure within the pilot chamber 18 is controlled by the valved orifice unit 21 which is generally similar in construction to that taught in U.S. Pat. No. 4,315,520. Referring to FIGS. 13, 13a and 14, the orifice 24 is formed in wall 103 spanning the annular wall 104 of section 17 and defining the outer wall of the pilot chamber 18. The orifice 24 projects outwardly defining a raised flat discharge edge 105 within the pilot output chamber 22, which is preferably formed with minute notches 105a in edge 105. Spring mounted closure unit 26 is a two-piece assembly including a plate-like closure member 106 formed of an appropriate material and interconnected to a spring mount unit member 107, shown as a special flat web spring member (FIG. 14) formed of a spring metal for supporting of the closure member 106 for parallel movement with respect to the plane of the orifice edge 105. More particularly, the closure member 106 is a generally round plate-like member formed of a relatively firm suitable material of a suitable durometer, such as 40–90D,Scale A. The member 106 may be formed of a rubber or rubber-like material, a corrugated paper, cloth or metal having a planar outer surface for parallel engagement with the orifice edge. Member 106 defines a flat surface overlying the nozzle orifice edge 105 in precise parallel relationship. The outer side of the member 106 has a central raised round surface 108.

Locating posts 109 are circumferentially spaced about the raised surface 105 in radially spaced relation thereto. The closure member 106 is affixed to the spring mount member 107, as follows, with particular reference to FIG. 14.

The spring mount member 107 is a flat metal member formed of a spring metal. The member 107 includes a round carrier disc having a diameter and configuration larger than the raised portion 108 of the closure member 106 and extended outwardly beyond the circle of the locating posts 109. The round plate or disc 110 has three circumferentially spaced openings 111 for receiving of posts 109 with a pressure fit to secure the closure of member 106 to the disc 110, particularly with the raised surface 108 in firm abutting engagement with the round disc 110. The mount member 107 further includes three flat springs 112 circumferentially spaced about the disc 110 and extending from the edge of the disc outwardly generally to the outer edge of the side wall 113 of the output chamber 22. Each of the three springs 112 is identically constructed. Thus, referring to the flat spring 112, a curved spring arm 114 is spaced from the edge of the disc 110, with the outer arm edge located adjacent the inner wall 113 of the chamber 22. The arm 114 has an outer enlarged end 115 with a coupling aperture 116. The output chamber 22 has three circumferentially spaced raised ledges 117 aligned with each of the enlarged ends 115 of the spring arms 114. Each raised ledge 117 includes a post 118 which passes through the aligned opening 116 in the enlarged end 115 of the curved arm 114 to firmly secure the end of spring arm 114 in fixed relation within the output chamber 22. A connecting spring arm 119 is secured to the free end of the curved arm 114 and extends back between the spring arm 114 and the disc 110. The inner end of the reverse spring arm 119 is connected to the disc by a short radial arm 120. The illustrated spring mount member 107 has been found to produce a particularly practical and effective support of the orifice closure member. Other spring supports providing a similar planar or movement of the closure member may be used.

In assembly, the annular wall 104 of the section 17 is secured abutting the diaphragm 14. The outer end of the annular wall 104 is sealed by the diaphragm 25 which forms a common wall with the set point section 27 of the regulator 1. A coupling assembly includes a plate 121 located within the output chamber 22. The plate 121 includes a hub 122 projecting through an opening in the diaphragm 25. A clamp plate 123 in section 27 has a threaded opening and is threaded onto the hub 122 to clamp the unit 27a member to the diaphragm 25. A generally cup-shaped housing 124 of section 27 has one end abutting the peripheral portion of the diaphragm 25 overlying the annular wall 104 of the pilot section 17. The housing 124 has the diaphragm abutting end spaced from the clamp plate 123 to define a gap within which a convolution 125 of the diaphragm 25 protrudes, and establishes a planar movement of the control member 27a on the axis 33 of the valve assembly. The inner face of the plate 121 has a center protrusion 126 extending inwardly, with the inner end of the protrusion hemispherically-shaped. A coil spring 127 is located within the housing 124 abutting clamp plate 123 and extends outwardly into engagement with an adjustable stop 130 which compresses the spring to provide a pressurized positioning of the protrusion 126 with respect to the spring disc 110. The adjustable stop 130 is mounted to an adjustable screw member 131 which is rotatably mounted in the outer end of the housing but held against axial movement. Control knob 6 is secured to the outer end of the screw for rotating the screw and axially moving the adjustable stop 130. Protrusion 126 is aligned with and thus engages a center point on the spring disc 110 as a result of the positioning of plate 121 of the point section 27. The disc 110 with closure member 106 thus moves in a plane toward and from orifice edge 105 in accordance with the spring 127 force and the hydraulic force in pilot output chamber 22 to a balance position and a set point pressure in pilot chamber 22. Thus, as the pressure rises in chamber 18, it opens the orifice unit 21 and allows the bleed flow through the precision orifice unit 20 and the passageway 19 to exit into the chamber 22 and back through passageway 23 to the output chamber 10, as previously described. The orifice unit 21 with the special mount spring structure and the separate closure member, as illustrated, provides a highly improved repeatable and consistent operation of the orifice unit 21. The special spring mounting of the sealing diaphragm maintains a precise parallel relationship of the sealing diaphragm relative to the planar sealing edge and surface of the orifice nozzle. If this parallel relationship is not maintained, an inconsistent action may result. The notch surface of the orifice nozzle, may have the same or different sized notches. If the plane of the sealing diaphragm movement is not parallel to the orifice surface, the diaphragm may seal evenly across the surface or may seal with first either larger or smaller orifices. This above inconsistencies may arise in a single unit or from one unit to the next of the same constructions, and have been particularly noted in leakage orifice units using a coil spring loading of the sealing diaphragm. Thus, the orifice unit generally functions as described in the previously identified U.S. Pat. No. 4,315, 520 but provides a very consistent and repeatable operation for such unit.

The bleed flow from orifice unit 21 to the output chamber 10 creates an increasing uptrending pressure condition trending to reposition the pressure relief valve unit 11 and creates a stable state with the appropriate ratio of pressures in pilot chamber 18 and output chamber 10 as a result of the differential effective areas of diaphragms 13 and 14.

The body members of the regulators are preferably precision injection molded components or otherwise so formed. The height of the elements and the interconnection of the components to provide an integrated assembly with the operative moving components in proper support is significant to production of optimum regulator functioning. Thus, the moving components should relatively move only as a reflection of the applied forces without generating other forces.

The illustrated embodiment in a typical application is connected to a pneumatic pressure source of 200 psi (pounds per square inch). The output pressure is regulated within a range of 0 to 160 psi output pressure. The diaphragms are connected to operate in the range of 700 psi. The multi-stage regulator has been constructed as relatively small, compact unit with a height significantly less than other prior art regulators known to the inventor, while maintaining an improved operation in any position and the various improvements encountered in the marketplace. Thus, the regulator may be readily constructed having a height of about three inches.

Although described in connection with the multiple stage unit, the various novel components which are not shown in the prior art can, of course, be separately used in other regulator valve devices. Further, the illustrated regulator requires a relatively low force setpoint spring unit. As a result, the regulator design is readily adapted to a push button type, such as hand-held regulators, remote stepped regulator and the like.

Figure 15:
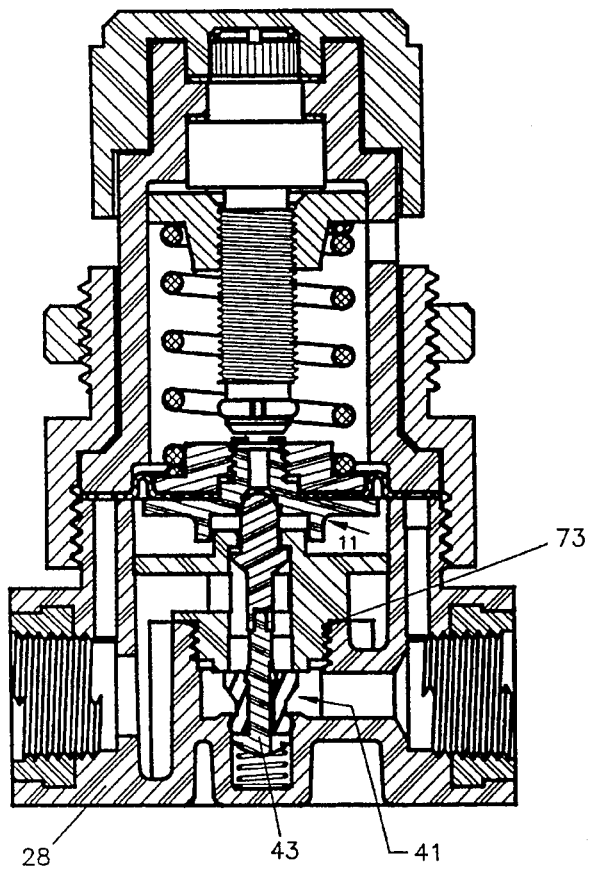
FIG. 15 is an alternate embodiment of a single stage regulator incorporating the improved main poppet valve construction shown in the multi-stage embodiment and incorporating with a cost effective leakage orifice.

The poppet valve unit 8 can be used in a single stage regulator, such as shown as in the '004 patent. An illustration of such single stage regulator, with a special novel leakage orifice, is illustrated in FIG. 15, with elements identified by numbers corresponding to the identifying numbers of the first embodiment.

Figure 15A:
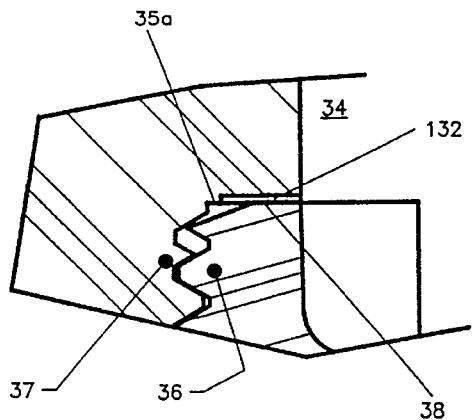
FIG. 15a is an enlarged fragmentary view illustrating a leakage orifice built into the primary poppet valve structure.

In single stage regulators of known constructions, the poppet valve section preferably includes a small continuous leakage orifice directly from the input chamber 9 to the output chamber 10. Referring particularly to FIGS. 15 and 15*a*, a single stage leakage orifice is provided at the otherwise sealed interface of the shoulders 35*a* and 38. As shown in FIG. 15 and more clearly in FIG. 5*a*, a passageway is formed by a small precision groove 132 in the shoulder 35*a* of the plate unit 34. The threaded connection at 36–37 permits passage of air from the inlet chamber 9 through the threaded portion to and then through the small radial precision groove 132. The finished surfaces of the shoulders 35*a* and 38 otherwise maintain an air tight connection from the inlet chamber to the output chamber. The pneumatic pressure at input chamber 9 readily passes air through the root and crest of the fine pitch threads to the interface of the shoulders. The bleed air passes outwardly to the output chamber 10 through the specially formed precision bleed groove 132 defining a small orifice. This single stage regulator of FIGS. 15 and 15*a* thus uses a single bleed passage which generates a bleed flow from the input chamber directly to the output chamber, and therefrom to the atmosphere. Again, the bleed through the bleed passage equals the flow to atmosphere. This provides the standard necessary controlled bleed of supply gas to the output of the single stage regulating valve and provides the necessary compensation for a downwardly trending pressure at the output chamber of the regulator. As is well known, such a bleed orifice helps to hide the hysteresis which is inherent to the primary valving configuration between the input and output chambers and allows the valving configuration to come to rest at a closed or sealed condition. The bleed in the single stage regulator is not essential, but is used whenever an improved and an enhanced regulator performance is required or desired. In certain applications not requiring the performance provided by a bleed, a single stage non-bleeding type regulator may be provided. In a multi-stage regulator, a bleed is required and generally two bleeds have been used.

Figure 16:
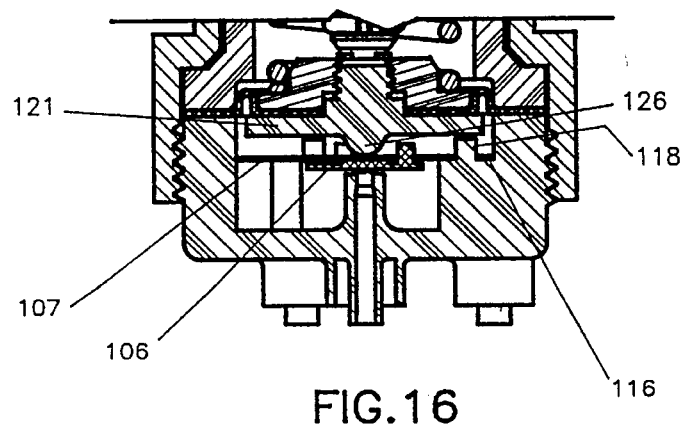
FIG. 16 is an embodiment of a regulator having the improved leakport orifice control configuration shown as part of the pilot control chamber of the first embodiment.
Figure 17:
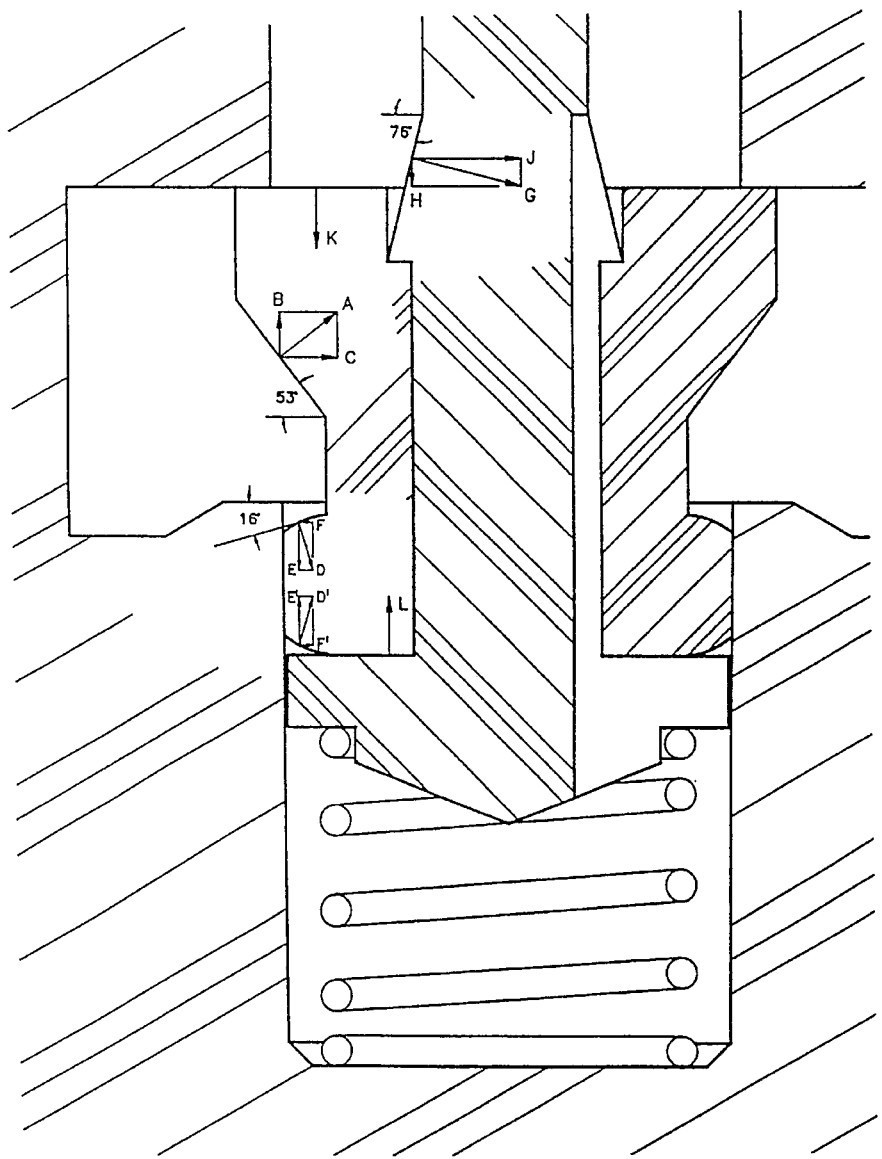
FIG. 17 is of a diagrammatic view of a poppet valve unit showing certain dimensional relationships and forces related thereto.
Figure 18:
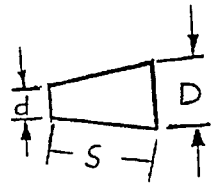
FIG. 18 is a separate diagrammatic view of the conical surface illustrating the supply side effective area of the poppet valve of FIG. 17.
Figure 19:
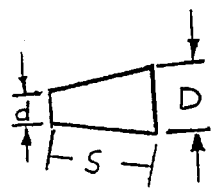
FIG. 19 is a view similar to FIG. 18 illustrating the outside effective area of a poppet valve.

The illustrated structure provides a simple but cost effective method of forming such a bleed orifice or transfer passageway. Generally, in practical applications, the leakage orifice is precision formed with a diameter in the range of 0.0010 to 0.010 inches. Although shown in the valve and shoulder, the groove may also be formed in the opposing shoulder, or partially in each. The illustrated construction provides a cost effective and simple system, particularly when using precision molded parts. Further, the improved orifice unit 21 of section 17 can be used directly in an application such as disclosed in the '520 patent, and such a structure is illustrated in FIG. 16.

Further, the poppet valve unit 8 with the balanced construction can be used in any other regulator adapted to have the in-line construction of the primary valve seat and the compensating chamber.

The inventors have found that the various components may advantageously included molded plastic body members. The plastics used in a practical cost effective construction included a polyphenylene sulfide available under the trademark "Ryton" from Phillips 66 Company and a fluorinated ethylene propylene supplied by the Dupont Company under the trademark "Teflon". Metal components included aluminum, grades 6061 and 6262, and steel, particularly a resin impregnated, powdered metal available as a stainless grade 304. The elastomers were a fluorocarbon, available from the 3m Company under the trademark "Fluorel".

The illustrated embodiments of the multi-stage regulators and the several basic component units have been shown and described in optimum and preferred constructions. Within each, other constructions may be provided for creating the described functioning, depending upon the limits and requirement of operation demanded or desired. For example, other known poppet valve units may be used. The opposing pressure responsive diaphragms acting on the relief valve may broadly be opposing piston members and the like. The pilot may use other forms of orifice units for establishing the necessary opposing pressure on the relief valve system.

Variations in the specific embodiment of the various unique aspects of the teaching herein can be readily applied and provided by those skilled in the art, based on the teaching of the function as presented in this application.

---

FLUID PRESSURE REGULATOR ESTABLISHING
A STABLE OUPTUT FLUID PRESSURE
APPENDIX I
Analysis of Fluid Forces on Poppet Valve Unit 8

---

Supply side effective area

Area of a conical surface = $1.5708(s)(D + d)$
$A = 1.5708(s)(.200 + .154)$
$\angle = 53°$  $\cos 53° = .023/s$   $s = .03822$
$A = .021353$ in2
$B - \cos 53° = .601815$    $= 42.97\%$ of A    $B = .00913$ in2
$C - \sin 53° = .798635$    $= 57.03\%$ of A
$D = 1.5708(s)(.193 + .154)$
$\angle = 16°$  $\cos 16° = .0195/s$   $s = .0203$
$D = .011065$ in2
$E - \cos 16° = .96126$    $= 77.7\%$ of D    $E = .0086$ in2
$F - \sin 16° = .27564$    $= 22.3\%$ of D
Supply Side Pressure Effect B↑ vs. E↓
↑.00913 in2 vs. ↓.0086 in2 yields ↑.00053 in2
A pressure variance in the supply chamber equal to 100 psi
change will yield a force variance on the poppet of 23 grams.
This change will be undetectable in the operation of the poppet.
Prior art suggests that a variance of 100 to 300 grams is
acceptable and very difficult to detect. An uncompensated poppet
of this size would yield a variance in force equal to 3.14
lbs. or 1424 grams.

Output side effective area

Area of a conical surface = $1.5708(s)(D + d)$
$G = 1.5708(s)(.100 + .070)$
$\angle = 76°$  $\cos 76° = .015/s$   $s = .062$
$G = .0165$ in2
$H - \cos 76° = .24192$    $= 19.96\%$ of G    $H = .0033$ in2
$J - \sin 76° = .9703$    $= 80.04\%$ of G
$K = (.200/2) 2 \cdot \pi + (.100/2)^2 \cdot \pi = .02355$ in2
$L = (.154/2)^2 \cdot \pi = .01862$ in2
Output Side Pressure Effect H↓ + K↓ vs. L↑ + E'↑
↓.0033 in2 ↓.02355 in2 vs. ↑.01862 in2 ↑.0086 in2 yields
↑.00037 in2
A pressure variance in the output chamber equal to 100 psi change
will yield a force variance on the poppet of 15.7 grams. This
change will be undetectable in the operation of the poppet.

---

Various modes of carrying out the invention are contemplated as being within the scope of the following claims particularly pointing out and distinctly claiming the subject matter which is regarded as the invention.

I claim:

1. A multi-stage regulator for a pressurized fluid source, comprising a regulating valve having an input chamber and an output chamber, a relief valve connected to said regulating valve and having a first pressure responsive component coupled to said output chamber for pressure relief venting of fluid from said output chamber, a pilot valve, a first connection between said pilot valve and said input chamber and a second connection between said pilot valve and said relief valve, a flow control unit in said connection of said pilot valve to said input chamber establishing a single bleed flow from said input chamber to said pilot valve and from said pilot valve to said output chamber and relief valve for venting said bleed flow, said pilot valve including a second pressure responsive component connected to said relief valve and operating in opposition to said first pressure responsive component, said relief valve forming a single and only bleed from said regulator for stabilizing the regulating valve, said first and second pressure responsive components being constructed and arranged to position said relief valve and directly compensate for uptrending pressure created by said bleed flow from said relief valve to said output chamber.

2. The regulator of claim 1, wherein said first pressure responsive component is an output pressure movable wall member forming a wall of said output chamber and connected to said relief valve, said pilot valve includes a pilot pressure chamber, said pilot valve having a pilot output chamber and said flow control unit including a presettable orifice unit connected between said pilot input chamber and pilot output chamber to establish a pilot pressure in said pilot pressure chamber, said pilot pressure chamber having a movable wall member forming said second pressure responsive component coupled to said relief valve, said pilot valve movable wall member having a preselected greater pressure than said output pressure movable wall member on said relief valve in accordance with said uptrending pressure in said output chamber of said main regulating valve and thereby preventing feedback to said pilot valve unit.

3. The multi-stage regulator of claim 2, wherein each of said first and second movable wall members is a first diaphragm and a second diaphragm, said first diaphragm forming the wall of said output chamber and said second diaphragm forming the wall of said pilot pressure chamber, said first diaphragm having a greater effective area than said second diaphragm.

4. The multi-stage regulator of claim 3, including pressure relief sections having an outer encircling tubular wall having first and second end walls, said first diaphragm secured to said first end wall, said second diaphragm secured to said second end wall, said tubular wall having a vent opening for discharge of fluid from the regulator.

5. The multi-stage regulator of claim 4, wherein said pressure relief valve includes a valve plate including a valve opening and seat, said valve plate abutting said first diaphragm with said valve opening and seat projecting through an opening in said first diaphragm and terminating in an inner end member having a lateral extension of said opening, a diaphragm plate abutting said inner end member, said second diaphragm being secured abutting said diaphragm plate.

6. The multi-stage regulator of claim 2, wherein said orifice unit includes an orifice wall having leakage orifice therein, said orifice having an outer edge, a closure unit mounted in overlying relation to said flat edge, said closure unit including a flat closure wall, a plurality of resilient supports secured to said closure wall and said orifice wall and supporting said flat closure wall in parallel relation to said outer flat edge of said leakage orifice, and a positioning member located to engage said flat closure wall in alignment with the center of said orifice and establishing movement of the closure wall in said parallel relation.

7. The regulator of claim 6, wherein said closure wall and said flat edge being constructed with at least one leakage path with the closure wall engaging said flat edge.

8. The regulator of claim 7, wherein said leakage path is defined by at least one notch in said flat edge.

9. The regulator of claim 6, wherein said orifice unit includes a body member having an outer tubular wall and wherein said flat closure wall and said plurality of resilient supports define a flat web spring member including a central disc and a plurality of circumferentially spaced spring arms, each of said spring arms having a serpentine configuration having an outer end fixedly secured to the outer wall and an inner end secured to the outer edge portion of said central disc overlying the orifice edge.

10. The regulator of claim 9, including a resilient facing on said flat closure wall facing said orifice edge.

11. The regulator of claim 9 including a resettable unit having a resiliently loaded setpoint member aligned with the center of said central disc.

12. The regulator of claim 9, wherein said positioning member includes a projecting member having a spherical surface located to engage said central disc in alignment with the center of said orifice edge.

13. The regulator of claim 6, wherein said first and second movable wall members is a first diaphragm and a second diaphragm, said first diaphragm forming the wall of said output chamber and said second diaphragm forming the wall of said pilot pressure chamber, said first diaphragm having a greater effective area than said second diaphragm whereby said pilot pressure must be greater to establish a balanced positioning of said relief valve unit.

14. The regulator of claim 1, wherein said regulating valve is a poppet valve unit including a poppet valve member having a first end portion with an outer sealing end face and a second end portion, and having a valve passageway having a valve seat located in opposed relation to said sealing end face and defining said output chamber and said input chamber and having a compensating chamber located in aligned relation to said valve seat, said compensating chamber having an open outer end, said second end portion of said poppet valve member being located in said open outer end of said compensating chamber and sealing said chamber, said poppet valve member having a transfer passageway connecting said output chamber and said compensating chamber, said poppet valve member having a reduced diameter connecting portion between said first end portion and said second end portion and said end portions having laterally extended surfaces from said connecting portion and said laterally extended surfaces constructed and arranged to balance the input fluid pressure established on said poppet valve member.

15. The pressure regulator of claim 14, wherein said transfer passageway includes a central opening in said poppet valve member, a poppet stem extended through said opening and establishing a fluid tight seal to said poppet valve member, said transfer passageway extended between said poppet valve member and said stem to couple the pressure in the output chamber to said compensating chamber and establish a balanced output fluid pressure on said poppet valve member.

16. The pressure regulator of claim 15, wherein said first pressure responsive component is a movable wall member forming a wall of said output chamber and connected to said relief valve, said pilot valve unit includes a pilot pressure chamber and an output chamber with a presettable orifice unit to establish a pilot pressure in said pilot pressure chamber, said pilot pressure chamber having a movable wall member forming said second pressure responsive component coupled to said relief valve, said pilot valve wall member having a preselected lesser effective area than said output pressure movable wall member, each of said first and second movable wall members is a first diaphragm and a second diaphragm, said first diaphragm forming the wall of said output chamber and said second diaphragm forming the wall of said pilot pressure chamber.

17. The pressure regulator of claim 16, including a pressure relief section having an outer encircling tubular wall having first and second end walls, said first diaphragm secured to said first end wall, said second diaphragm secured to said second end wall, said tubular wall having a vent opening for discharge of fluid from the regulator.

18. The pressure regulator of claim 15, wherein said balanced pressure on said poppet valve member creates a slight net pressure biasing said regulating valve closed.

19. The regulator of claim 1, wherein said output chamber includes a valve output opening having a flat valve seat, a compensating chamber located in said input chamber in aligned spaced relation to said opening and valve seat and having an outer end, a valve poppet having a cylindrical hour-glass shape including a first enlarged end portion located adjacent said flat valve seat and a second enlarged end portion having an end wall within said compensating chamber, said first and second end portions being joined by a reduced cylindrical portion of a substantially constant diameter, said first end portion having a flat end wall overlying said flat valve seat and defining a varying orifice between the input chamber and the output opening, said second enlarged end portion located in sealing engagement within said outer end of said compensating chamber, said first and said second enlarged portions being constructed with facing radial end surfaces of different effective areas, to establish a first pneumatic balance in response to varying input pressure, said poppet valve having a central stem extending from the opposite ends of said poppet valve with a conical end surface facing said outer opening and a substantially flat surface face; said compensating chamber having a small pressure transfer opening transmitting output pressure to said compensating chamber to establish a second pneumatic balance over said valve poppet, said first and second effective areas each establishing a net substantially fluid balancing the valve poppet to engage said valve seat.

20. The poppet valve unit of claim 19, wherein said valve poppet includes a first body member with a central opening having an enlarged opening adjacent said flat seat and a substantially constant diameter opening extending therefrom, said stem being a second body member having an inner end of a diameter substantially corresponding to the second enlarged end and having a conical portion with a flat face engaging said enlarged opening and extending outwardly into said output opening, and said transfer opening defined by said small slot formed in the side of said stem extending from said conical portion through said inner end.

21. The poppet valve unit of claim 20, wherein said first body member and said stem are formed of material permitting the enlarged end of said first body member to form a snap assembly of said body member and said stem.

22. A multi-stage pressure regulator for controlling a pressurized fluid supplied to a load at a substantially constant pressure with changes in the output flow of the fluid, comprising a regulating valve section including a poppet valve unit between an input chamber adapted to be connected to a fluid supply and an output chamber, a pressure relief valve unit coupled to said poppet valve unit and having a bleed opening, a bleed section including a first pressure responsive support connected to said pressure relief valve and subjected to said output chamber pressure for urging said pressure relief valve to a valve open state, a second pressure responsive support connected to said pressure relief valve for urging said pressure relief valve to a closed position, a pilot pressure control section having a pilot pressure chamber coupled to said second pressure responsive support, a precision bleed unit coupled to the input chamber of said poppet valve unit and to said pilot pressure chamber, a variable orifice unit connected to said pressure control unit and operable to pass said bleed fluid from said pilot pressure chamber, a passageway connected to said orifice unit to pass said bleed fluid to said output chamber of said poppet valve unit, said first and second pressure responsive supports having a ratio control on said pressure relief valve such that the pressure in the pilot pressure chamber must exceed the pressure in said output chamber in a selected ratio to establish an equilibrium position of the pressure relief valve for releasing a single small bleed of fluid to stabilize the position of the poppet valve unit and the main bleed flow from the output side of the poppet valve unit.

23. The regulator of claim 22 wherein said pressure relief valve includes a valve member coupled to said poppet valve unit and positioned thereby and a valve seat unit having said opening to said output chamber of said poppet valve unit, said first pressure responsive support including a first diaphragm member having said valve seat unit secured thereto and supporting and moving said valve seat unit relative to said valve member, said second pressure responsive support includes a second diaphragm member connected to said valve seat unit for supporting and moving said valve seat unit, and an annular wall unit secured to said regulating valve section with said first diaphragm unit forming a wall of the output chamber.

24. A poppet unit for a regulating valve having an input chamber and an output chamber extending therefrom with a valve seat wall at the connection of said chambers and with a compensating chamber aligned with said valve seat wall, comprising an hour-glass shaped poppet body having a first enlarged end portion for engaging said seat wall to close and open the connection of said chambers and a second enlarged end for sealing insertion into the compensating chamber and an intermediate connecting portion between said enlarged end portions, said connecting portion having a substantially smaller cross-section than said enlarged end portions, said enlarged end portions, having outer end walls and having opposed facing lateral extension surfaces joined to said connecting portion within said input chamber and constructed to establish a first substantially balanced fluid force on said poppet body, said poppet body having a central opening, a valve stem located within said central opening sealing said central opening and extending outwardly of said central opening and including first and second locking elements abutting the end walls of said first and second enlarged, end portions, said stem and valve body including a pressure transfer opening between the stem and the central opening for connecting the compensating chamber to the output chamber, said locking elements being constructed to establish output pressure to the opposite ends of said body member to establish a second substantially balanced fluid force on said poppet body.

25. The poppet unit of claim 24 wherein said first and second substantially balanced fluid forces establish a slight net fluid force urging said valve body outwardly of said compensating chamber and thereby said first enlarged end into sealing engagement with said valve seat wall.

26. The poppet unit of claim 25 having a spring unit coupled to the second enlarged end and creating a slight outward force on said body member.

27. The poppet unit of claim 25 wherein said central opening includes an enlarged opening in the end wall of said first enlarged end portion, said first locking element having a conical shape with a wide base abutting said enlarged opening and tapering outwardly therefrom.

28. The poppet of claim 24 wherein said transfer opening is formed by a slot in the outer surface of said stem.

29. The regulator of claim 28 including a body member, an inlet port and an outlet port connected to said output chamber, said body member having first and second wall members located between said input chamber and said output chamber, said first wall member being a cylindrical wall integrally formed with said body member and extended substantially perpendicular between said chambers and including a wall opening aligned with said input port, said first wall member having an inner open end and having an internal thread in said open end, and a finished flat end wall, said second wall member having a tubular portion threaded into said first wall member and having a flat finished end wall abutting said finished flat end wall of said first wall member and forming a fluid tight interface, and having a bleed orifice formed in said interface extending from said threaded connection to said output chamber and said threaded connection passing fluid from said input chamber to said bleed orifice and therefrom to said output chamber.

30. A single stage regulator including a valved passageway connected between an input chamber and an output chamber, comprising first and second tubular wall members, one member being threaded into the second member with one end of the threaded connection terminating in one of said chambers, said wall members being mated laterally extended planar walls defining a fluid tight sealing interface terminating in the other of said chambers from said one of said chambers, a bleed orifice formed in said sealing interface and connecting said threaded connection to said other of said chambers, said threaded connection passing bleed fluid from said other of said one of said chambers to said bleed orifice.

31. A pressure regulating leakage orifice unit comprising an orifice wall having a leakage orifice therein, said orifice having an outer exit edge, a closure unit mounted in overlying relation to said exit edge, said closure unit including a flat closure wall overlying said exit edge, a plurality of resilient supports secured to said closure wall and said orifice wall and supporting said flat closure wall in parallel relation to said outer exit edge of said leakage orifice for movement toward and away from said exit edge in said parallel relation, and a movable positioning member having an engaging end engaging said flat closure wall in alignment with the center of said orifice and thereby establishing movement of the closure wall in said parallel relation to said exit edge, said flat closure wall and said exit edge being constructed with at least one leakage path with the closure wall engaging said exit edge.

32. The leakage orifice unit of claim 31, including a body member wherein said body member has an outer peripheral wall and said flat closure wall and said plurality of resilient supports define a flat web spring member including a central disc forming the closure wall and a plurality of circumferentially spaced spring arms, each of said spring arms having a serpentine configuration having an outer end fixedly secured to the outer wall with said central disc overlying the orifice edge.

33. The leakage orifice unit of claim 32 including a resilient facing on said flat closure wall facing said orifice unit.

34. The leakage orifice unit of claim 32 wherein said positioning member forms a presettable unit including a resiliently loaded setpoint member.

* * * * *

UNITED STATES PATENT AND TRADEMARK OFFICE
CERTIFICATE OF CORRECTION

PATENT NO. : 5,595,209
DATED : January 21, 1997
INVENTOR(S) : LOUIS D. ATKINSON ET AL It is certified that error appears in the above-identified patent and that said Letters Patent is hereby corrected as shown below:

Column 18, line 59, CLAIM 16, after "valve" (second occurr.) insert ---movable---; Column 18, line 66, CLAIM 17, before "including" insert ---wherein said relief valve---; Column 19, line 3, CLAIM 17, before "said" (second occurr.) insert ---and---.

Signed and Sealed this

Fourteenth Day of October, 1997

Attest:

BRUCE LEHMAN

Attesting Officer

Commissioner of Patents and Trademarks